（12) United States Patent
Towell et al.

(10) Patent No.: US 12,292,138 B2
(45) Date of Patent: May 6, 2025

(54) HIGH TEMPERATURE REMOTELY CONNECTED/DISCONNECTED PIPE CONNECTOR FOR MOLTEN SALT REACTORS

(71) Applicant: Abilene Christian University, Abilene, TX (US)

(72) Inventors: Rusty Towell, Abilene, TX (US); Thomas Bailey, Abilene, TX (US); Tim Head, Abilene, TX (US)

(73) Assignee: Abilene Christian University, Abilene, TX (US)

( * ) Notice: Subject to any disclaimer, the term of this patent is extended or adjusted under 35 U.S.C. 154(b) by 0 days.

(21) Appl. No.: 17/907,505

(22) PCT Filed: Mar. 11, 2022

(86) PCT No.: PCT/US2022/019959
§ 371 (c)(1),
(2) Date: Sep. 27, 2022

(87) PCT Pub. No.: WO2022/192673
PCT Pub. Date: Sep. 15, 2022

(65) Prior Publication Data
US 2023/0408002 A1 Dec. 21, 2023

Related U.S. Application Data

(60) Provisional application No. 63/160,051, filed on Mar. 12, 2021.

(51) Int. Cl.
F16L 19/00 (2006.01)
F16L 15/00 (2006.01)
(Continued)

(52) U.S. Cl.
CPC ........... *F16L 15/007* (2013.01); *F16L 15/008* (2013.01); *F16L 19/005* (2013.01);
(Continued)

(58) Field of Classification Search
CPC . F16L 19/005; F16L 19/0212; F16L 19/0218; F16L 19/025
See application file for complete search history.

(56) References Cited

U.S. PATENT DOCUMENTS 2,291,709 A 8/1942 Goetze
2,669,465 A 2/1954 Newell
(Continued)

FOREIGN PATENT DOCUMENTS

CN 102878109 1/2013
CN 102937090 2/2013
(Continued)

OTHER PUBLICATIONS

International Search Report for PCT/US2022/019959, issued Jul. 19, 2022.

*Primary Examiner* — Matthew Troutman
*Assistant Examiner* — Fannie Kee
(74) *Attorney, Agent, or Firm* — King & Spalding

(57) ABSTRACT

A pipe connector for use in high temperature environments, such as those characteristics of molten salt reactors. The pipe connector can be used in any industry that uses pipe connectors, and in particular, can be used in a molten salt system including a reactor requiring a connection rated for a maximum of about 725° C. and about 15,000 psi. The pipe connector may comprise a pin, a seal ring, a retainer ring, a box, a locking nut, and a retaining nut.

12 Claims, 17 Drawing Sheets

(51) Int. Cl.
*F16L 19/02* (2006.01)
*F16L 19/025* (2006.01)
*F16L 59/18* (2006.01)

(52) U.S. Cl.
CPC ....... *F16L 19/0212* (2013.01); *F16L 19/0218* (2013.01); *F16L 19/025* (2013.01); *F16L 59/18* (2013.01); *F16L 2201/40* (2013.01)

(56) References Cited

U.S. PATENT DOCUMENTS

| | | | |
|---|---|---|---|
| 2,829,673 A * | 4/1958 | Reese | F16L 19/0218 138/44 |
| 3,471,181 A | 10/1969 | Fuentes | |
| 3,972,547 A | 8/1976 | Itoya | |
| 5,016,920 A | 5/1991 | Anderson | |
| 5,630,592 A | 5/1997 | Obara et al. | |
| 8,857,863 B1 * | 10/2014 | Patin | F16L 19/025 285/38 |
| 9,522,462 B2 | 12/2016 | Baker et al. | |
| 10,197,200 B2 | 2/2019 | Kolb et al. | |
| 2007/0267867 A1 | 11/2007 | Kloss | |
| 2010/0127493 A1 | 5/2010 | Felder | |
| 2014/0312617 A1 * | 10/2014 | Okabe | F16L 19/0212 285/354 |
| 2016/0305587 A1 | 10/2016 | Vigre | |
| 2017/0206984 A1 | 7/2017 | Lee et al. | |
| 2018/0080587 A1 * | 3/2018 | Gauss | F16L 19/005 |
| 2018/0238477 A1 * | 8/2018 | Gauss | F16L 19/0218 |
| 2020/0049281 A1 * | 2/2020 | Zuzelski | F16L 19/0218 |
| 2021/0272707 A1 | 9/2021 | Wardle | |
| 2023/0024126 A1 * | 1/2023 | Harada | F16L 19/025 |

FOREIGN PATENT DOCUMENTS

| | | | |
|---|---|---|---|
| CN | 106247043 | 12/2016 | |
| CN | 108167195 | 6/2018 | |
| CN | 111508627 | 8/2020 | |
| CN | 212934166 | 4/2021 | |
| CN | 115076479 | 9/2022 | |
| EP | 3066375 | 1/2018 | |
| KR | 10-2292221 | 8/2021 | |
| WO | WO-9523908 A2 * | 9/1995 | .......... F16L 19/0218 |
| WO | WO-2008123812 A1 * | 10/2008 | ............ F16L 19/025 |
| WO | WO-2018111729 A1 * | 6/2018 | .......... F16L 19/0218 |

* cited by examiner

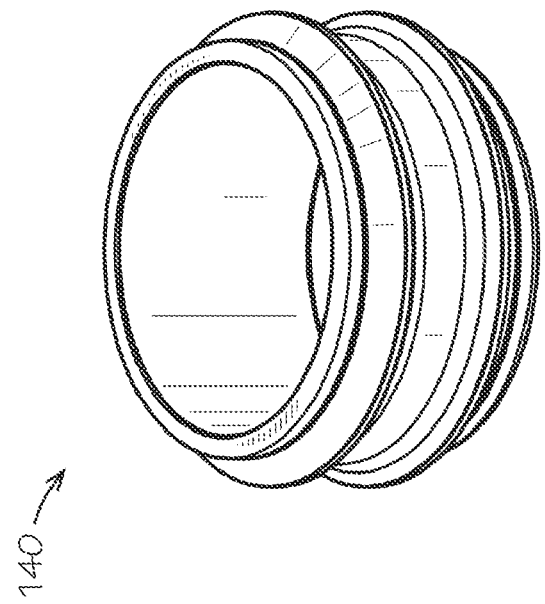
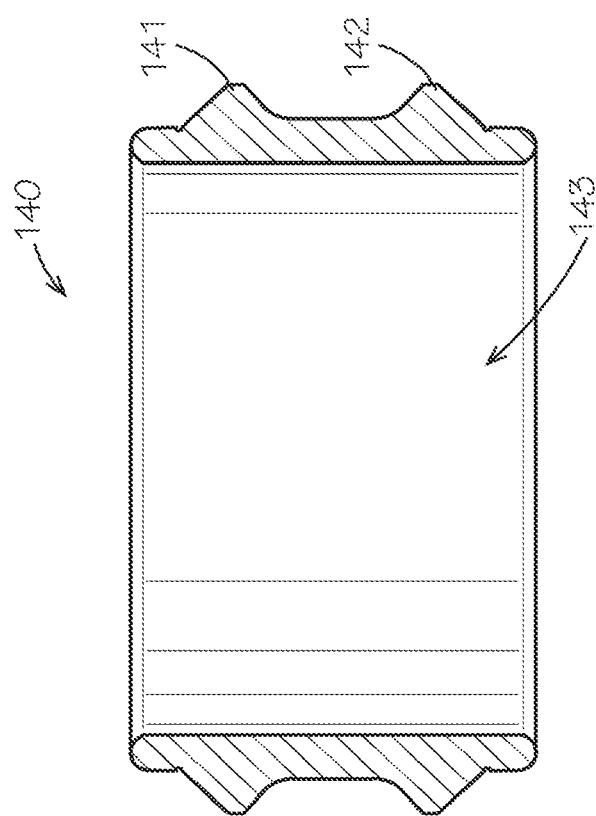
FIG. 9B
FIG. 9A

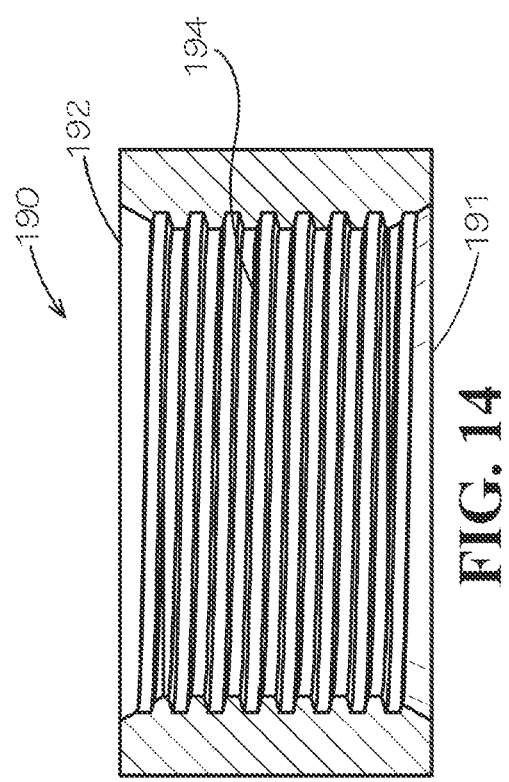

HIGH TEMPERATURE REMOTELY CONNECTED/DISCONNECTED PIPE CONNECTOR FOR MOLTEN SALT REACTORS

CROSS-REFERENCE TO RELATED APPLICATION

This application is a national phase entry of and claims priority to PCT/US2022/019959 titled "HIGH TEMPERATURE REMOTELY CONNECTED/DISCONNECTED PIPE CONNECTOR FOR MOLTEN SALT REACTORS," and filed on Mar. 11, 2022, which claims priority to U.S. Provisional Patent Application No. 63/160,051 titled "HIGH TEMPERATURE REMOTELY CONNECTED/DISCONNECTED PIPE CONNECTOR FOR MOLTEN SALT REACTORS," and filed on Mar. 12, 2021, the entire contents of which are incorporated herein by reference.

TECHNICAL FIELD

Disclosed herein are pipe connectors, and more particularly, pipe connectors for use in high temperatures, such as in molten salt reactors.

BACKGROUND OF THE INVENTION

Current pipe connectors are generally either a flange design or a clamp design. The flange design uses a flange at one end of a pipe that extends radially outward from the pipe with holes around the outer periphery of the flange for bolting together with another flange from a different pipe. A gasket is generally placed between the two flanges, which provides a seal to prevent fluids or gases from leaking through the connection. The clamp design has a hub that extends radially outward with a taper on the outside surface. Two clamps engage the taper surface with holes for bolting the two together. A gasket is positioned between the two clamp hubs, which provides a seal to prevent fluids or gases from leaking through the connection. Both of these designs require tightening/loosening multiple bolts and nuts. Nor do these designs permit the ability to remotely make up or break out the connection, thus requiring personnel to work in close proximity to the connection, which can expose personnel to hazardous conditions should the fluids or gases leak from the pipes. There remains a need for improved pipe connector designs, including for use in high temperature environments.

BRIEF DESCRIPTION OF THE DRAWINGS

The foregoing and other features and aspects of the invention are best understood with reference to the following description of certain exemplary embodiments, when read in conjunction with the accompanying drawings, which are not necessarily drawn to scale, and wherein:

FIG. 9A shows a cross-sectional view of the seal ring 140 and FIG. 9B shows a perspective view of the seal ring 140 in accordance with the exemplary embodiment;

FIG. 14 shows a cross-sectional view of the retaining nut 190 in accordance with the exemplary embodiment;

Figure 1:
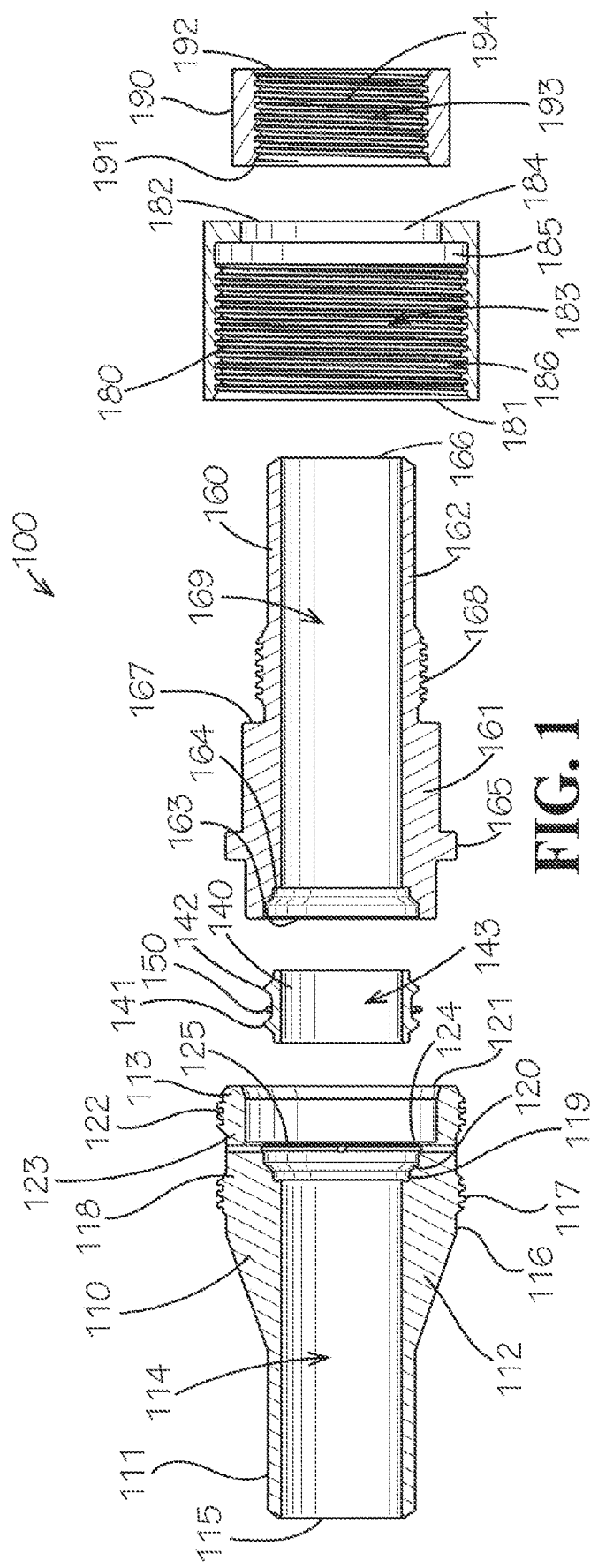
FIG. 1 shows a cross-sectional exploded view of a pipe connector in accordance with the exemplary embodiment.

The drawings illustrate only exemplary embodiments of the invention and are therefore not to be considered limiting of its scope, as the invention may admit to other equally effective embodiments.

DETAILED DESCRIPTION OF EXEMPLARY EMBODIMENTS

The exemplary embodiment disclosed herein is directed to pipe connectors, and more particularly to pipe connectors for use in high temperature environments, such as those characteristics of molten salt reactors. The pipe connector described herein can be used in any industry that uses pipe connectors. In certain embodiments, the exemplary pipe connectors can be used in building a molten salt system including a reactor or any other industry (e.g., the petroleum industry, in particular the refining sector) requiring a connection rated for temperatures over 700° C. and pressures up to 15,000 psi. In particular, the exemplary pipe connector maintains a seal connection between pipes at temperatures greater than about 700° C., or greater than about 725° C. The temperature at which the pipe connector can used is not particularly limited. In certain embodiments, the pipe connectors can maintain a seal connection between pipes at temperatures in the range of about −20° C. to about 1000° C., about −20° C. to about 900° C., or about −20° C. to about 800° C.

The pipe connectors are suitable for use across a wide range of pressures. In certain embodiments, the exemplary pipe connectors can be used at pressures ranging from atmospheric up to about 2000 psi, from atmospheric to about 5000 psi, from atmospheric to about 10,000 psi, or from atmospheric to about 15,000 psi. In certain embodiments, the exemplary pipe connectors may comprise certain design modifications to accommodate higher pressure, for example changing the outer diameter to increase the strength of the exemplary pipe connector. Typically, in the molten salt applications, the exemplary pipe connector is required to operate at a temperature of about 725° C. and a pressure up to 100 psi. As referred to herein, "molten salt" means a salt which is solid at standard temperature and pressure but enters the liquid phase due to elevated temperature.

An exemplary embodiment of the pipe connector will now be described more fully hereinafter with reference to the accompanying drawings, in which an exemplary embodiment of the pipe connector is shown. The pipe connector may, however, be embodied in many different forms and should not be construed as limited to the exemplary embodiment set forth herein. Rather, the exemplary embodiment is provided so that this disclosure will be thorough and complete, and will fully convey the scope of the pipe connector to those people having ordinary skill in the art. Like, but not necessarily the same, elements in the various figures are denoted by like reference numerals for consistency.

Figure 2:
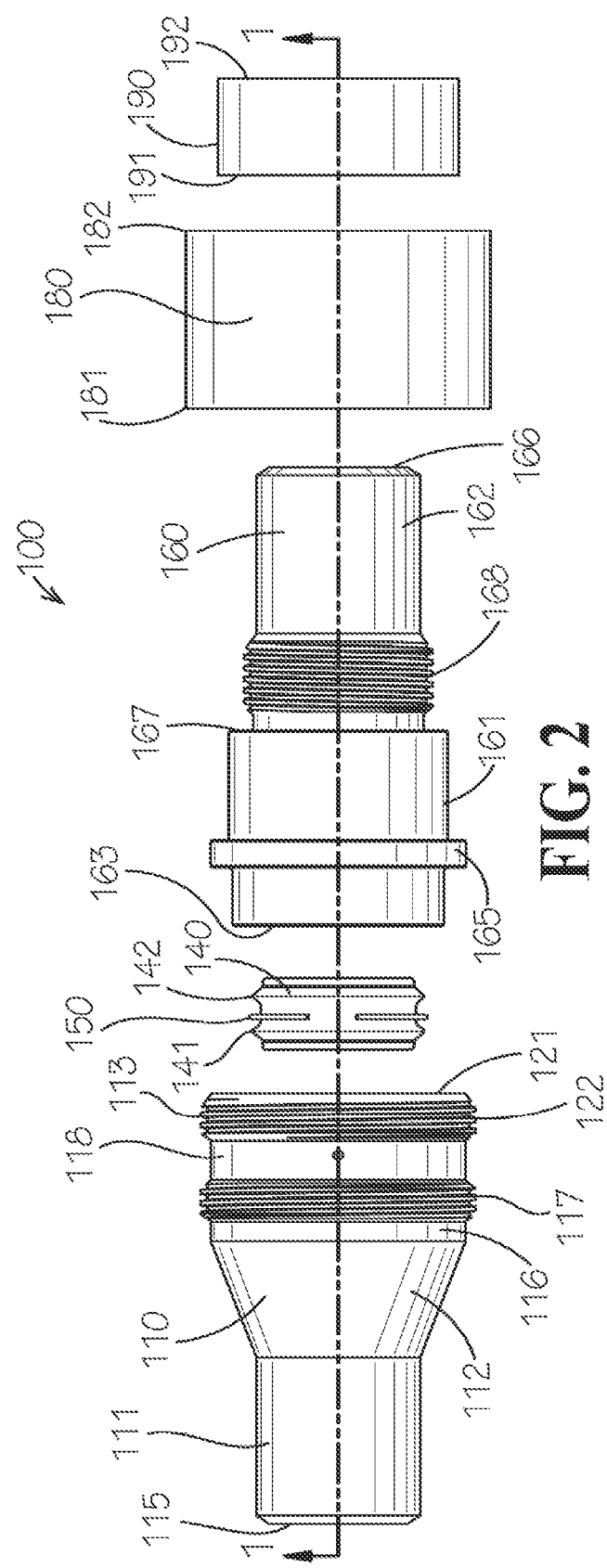
FIG. 2 shows an external exploded view of the pipe connector of FIG. 1 in accordance with the exemplary embodiment.
Figure 3:
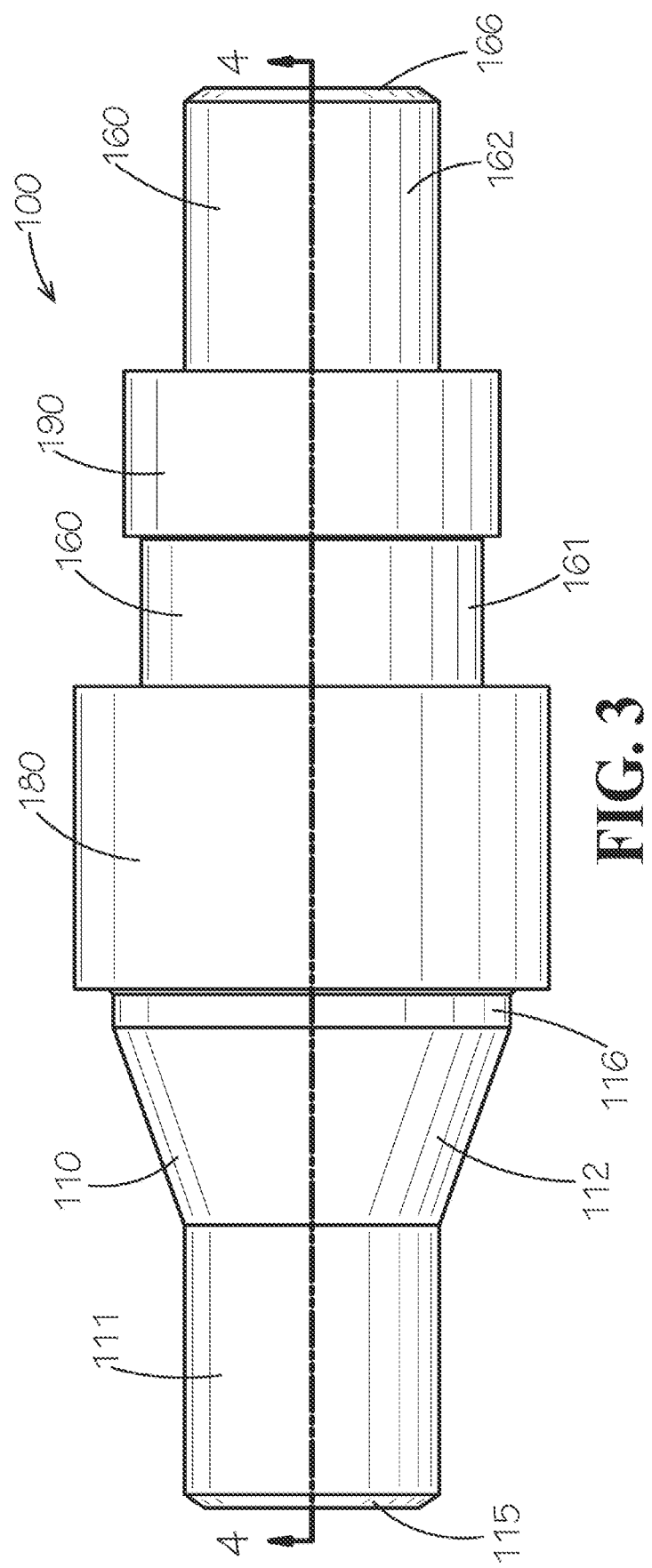
FIG. 3 shows an external assembled view of the pipe connector of FIG. 1 in accordance with the exemplary embodiment.
Figure 4:
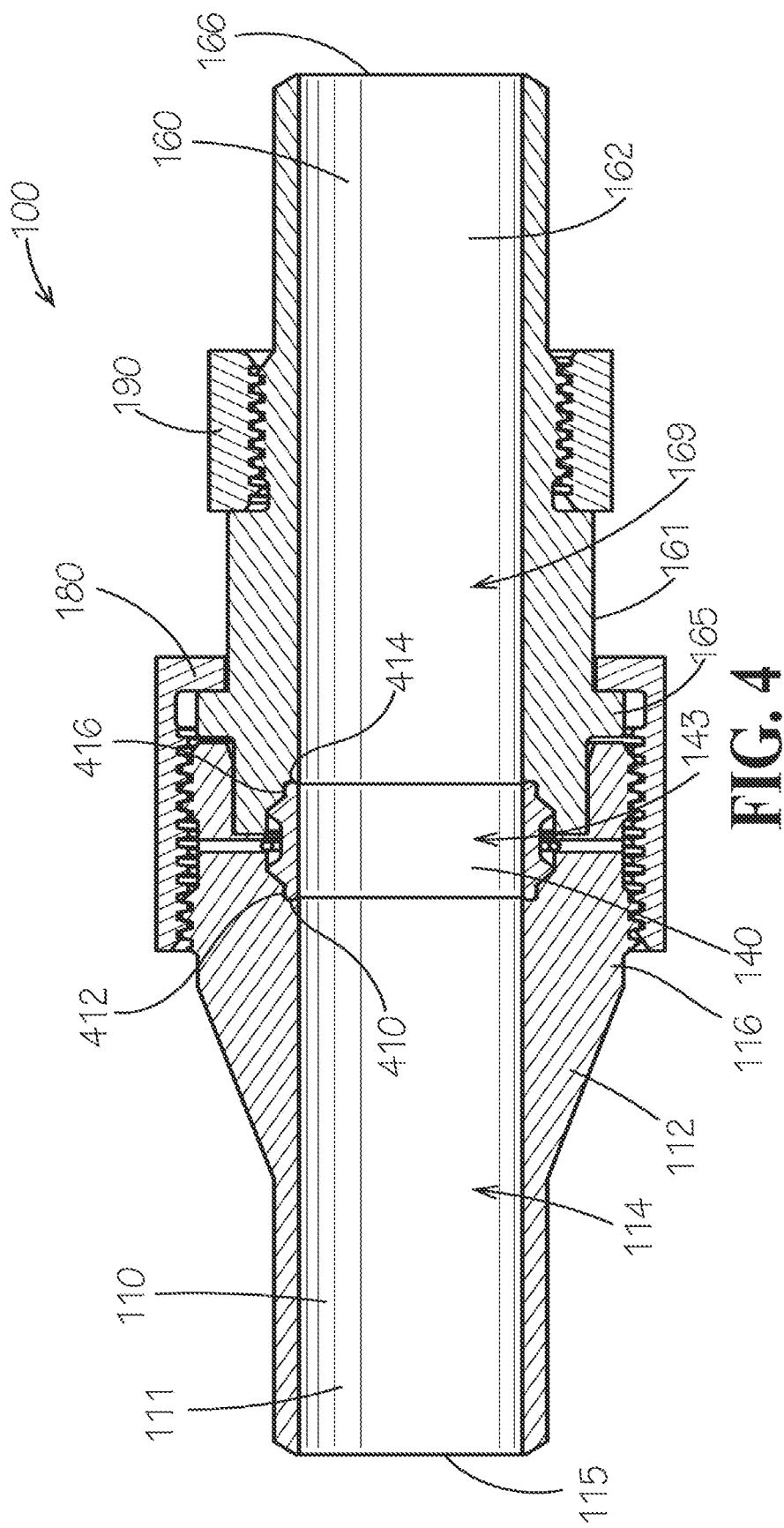
FIG. 4 shows a cross-sectional assembled view of the pipe connector of FIG. 1 illustrating the seal connections between the pin 110 and the box 160 with seal ring 140 in accordance with the exemplary embodiment.
Figure 5B:
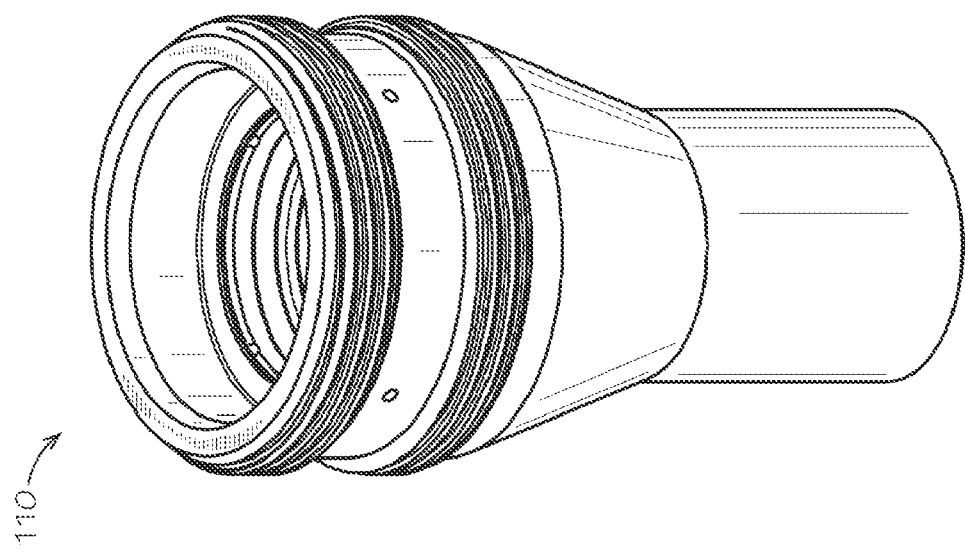
FIG. 5A shows an external view of the pin 110 and FIG. 5B shows a perspective view of the pin 110 in accordance with the exemplary embodiment.
Figure 5A:
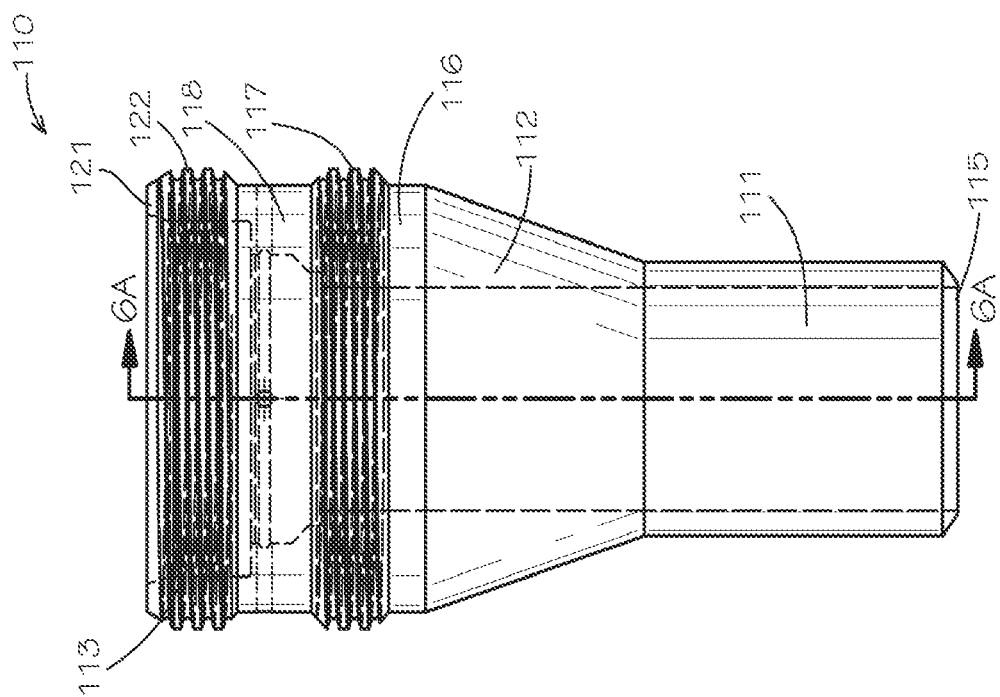
Figure 6B:
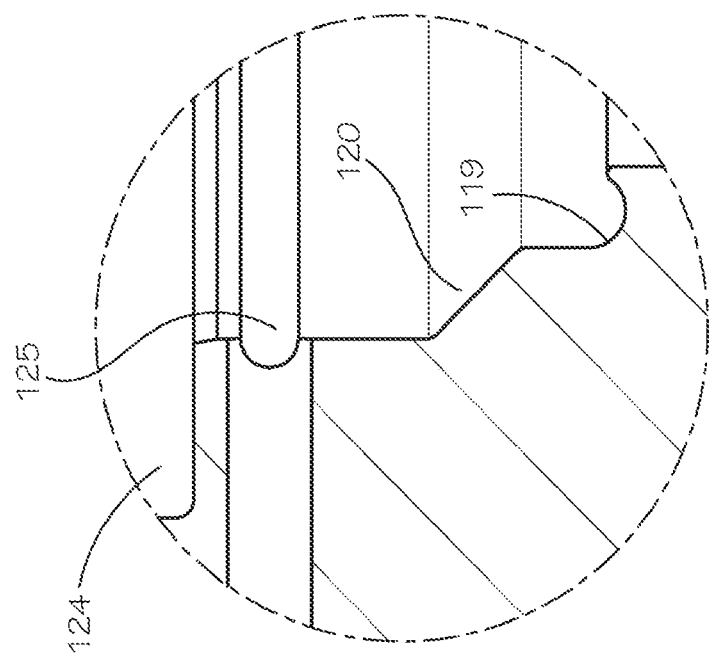
FIG. 6A show a cross-sectional view of the pin 110 and FIG. 6B shows a close-up view of the transition portion 112 adjacent the second portion 113 of the pin 110 in accordance with the exemplary embodiment.
Figure 6A:
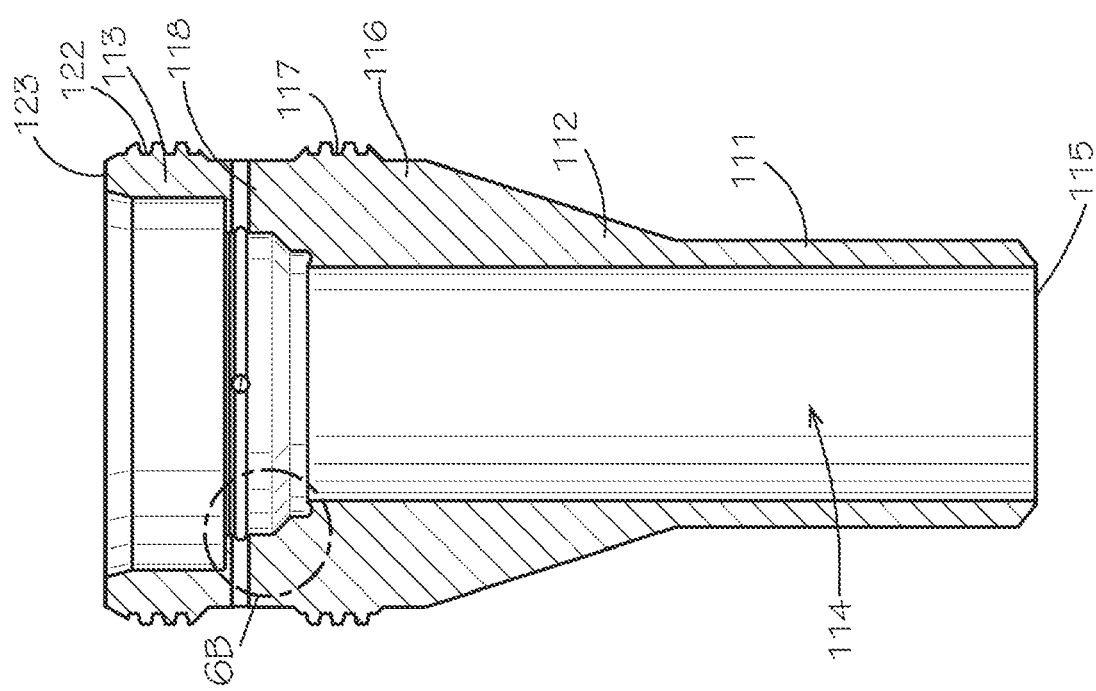
Figure 7B:
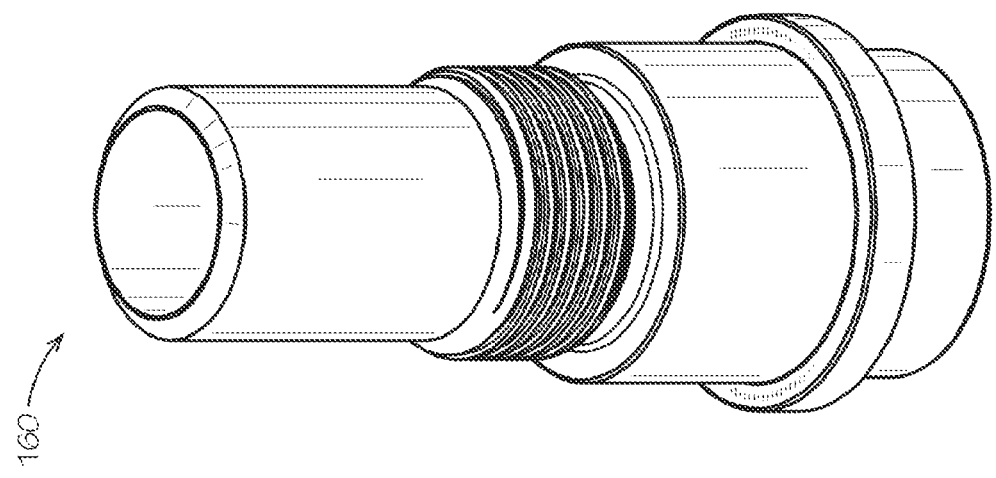
FIG. 7A shows an external view of the box 160 and FIG. 7B shows a perspective view of the box 160 in accordance with the exemplary embodiment.
Figure 7A:
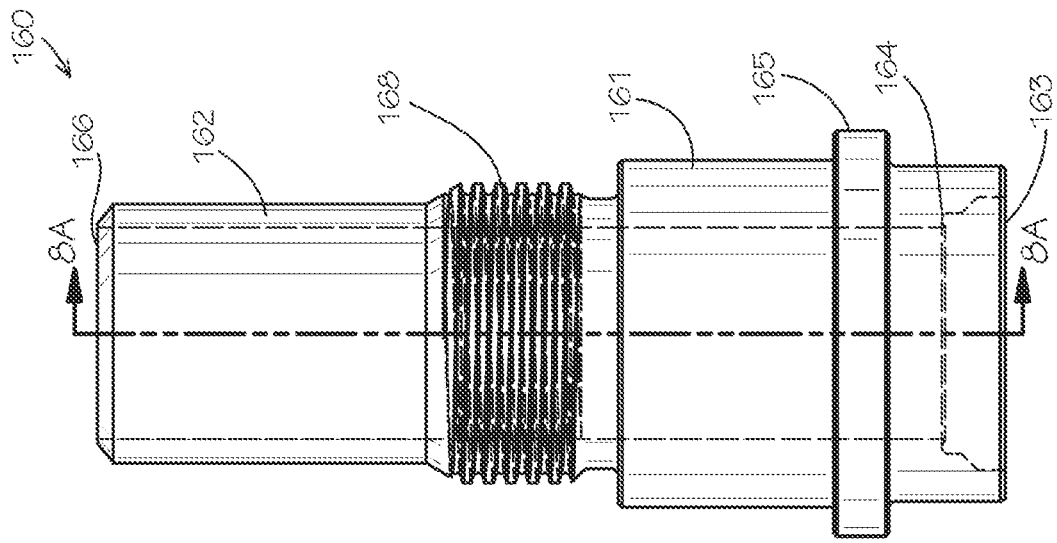

FIGS. 1-4 show cross-sectional or external views of a pipe connector 100 in accordance with an exemplary embodiment. FIG. 1 shows a cross-sectional exploded view of the pipe connector 100 in accordance with the exemplary embodiment. FIG. 2 shows an external view of the pipe connector 100 of FIG. 1. FIG. 3 shows an external assembled view of the pipe connector of FIG. 1 in accordance with the exemplary embodiment. FIG. 4 shows a cross-sectional assembled view of the pipe connector of FIG. 1 illustrating the seal connections between the pin 110 and the box 160 with seal ring 140 in accordance with the exemplary embodiment. Referring to FIGS. 1-4, the pipe connector 100 includes a pin 110, a seal ring 140, a retainer ring 150, a box 160, a locking nut 180, and a retaining nut 190 according to certain exemplary embodiments.

The pin 110 is cylindrical in shape and includes a first portion 111, a second portion 113, and a transition portion 112 extending between the first portion 111 and the second portion 113. The pin 110 defines a passage 114 extending therethrough for fluid, either liquids or gases, to flow therethrough. The first portion 111 extends from a first end 115 of the pin 110 to the transition portion 112 and has a smooth internal surface having a constant circumference according to the exemplary embodiment; however, the internal surface may not be smooth or not have a constant circumference in other embodiments. The transition portion 112 extends from the first portion 111 to the second portion 113. The outer surface of the transition portion 112 gradually increases in circumference as the transition portion 112 extends from the first portion 111 to a transition point 116 located along the transition portion's 112 outer surface, wherein the transition portion's 112 outer surface then has a circumference that is constant as the outer surface extends from the transition point 116 to the second portion 113. The transition portion 112 also includes a plurality of threads 117 extending outwardly from its outer surface adjacent to the second portion 113. Most of the internal surface of the transition portion 112 is smooth and has a constant circumference which is the same as the internal circumference of the first portion 111; however, the circumference of the internal surface is larger towards its end adjacent the second portion 113, thereby causing the end of the transition portion 112 adjacent the second portion 113 to have a first thickness 118. Further, the internal surface of the transition portion 112 adjacent the second portion 113 has first groove 119 and a second groove 120 formed therein, wherein the second groove 120 is formed deeper that the first groove 119. The second portion 113 extends from the end of the transition portion 112 to a second end 121 of the pin 110. The second portion 113 includes a plurality of threads 122 extending outwardly from its outer surface adjacent the second end 121. The second portion's outer surface is the same circumference at the end of the transition portion 112 located adjacent the second portion 113. The second portion's internal surface is smooth and has a larger circumference than the circumference of the transition portion's internal surface located adjacent the second portion 113, thereby causing the second portion to have a second thickness 123. The second thickness 123 is less than the first thickness 118, thereby forming a ledge 124 where the transition portion 112 transitions to the second portion 113. The ledge 124 includes a third groove 125 formed within its internal surface. FIGS. 5A, 5B, 6A and 6B show cross-sectional or perspective views of a pin 110 in accordance with an exemplary embodiment.

The seal ring 140 is cylindrical in shape and includes a first ridge 141 and a second ridge 142 extending outwardly from the outer surface adjacent each of its ends. The first ridge 141 is configured to fit within the second groove 120 and the end of the seal ring 140 adjacent the first ridge 141 is configured to rest atop and adjacent the first groove 119. The seal ring 140 defines a passage 143 extending therethrough for fluid, either liquids or gases, to flow therethrough. The seal ring's internal surface is smooth and has a circumference that is equal to the circumference of the pin's first portion's 111 internal surface such that diameter or circumference of passage 114 extending from the first portion 111 to the transition portion 112 to the seal ring 140 is the same once the seal ring 140 is installed within the pin 110. FIGS. 9A, 9B, 10A and 10B show cross-sectional or perspective views of a seal ring 140 in accordance with an exemplary embodiment.

The retainer ring 150 is ring shaped and is configured to fit within the third groove 125. The retainer ring 150 also is configured to be positioned around the seal ring 140 between the first ridge 141 and the second ridge 142 once the retainer ring 150 is installed within the pin 110.

Figure 8B:
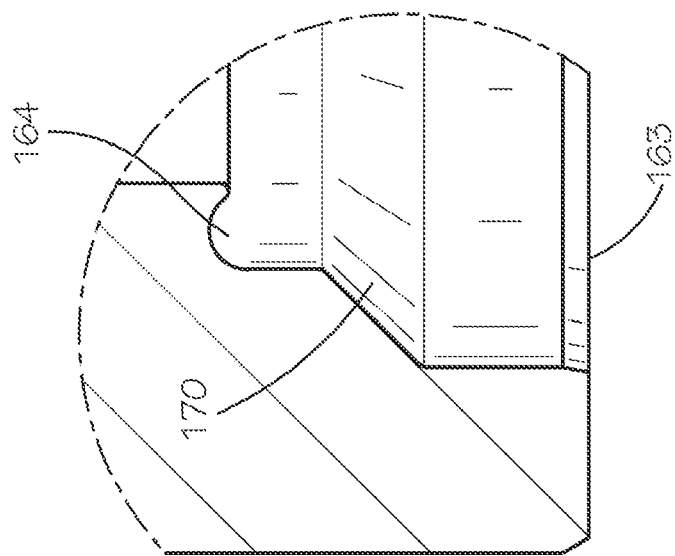
FIG. 8A show a cross-sectional view of the box 160 and FIG. 8B shows a close-up view of the first end 163 of the box 160 in accordance with the exemplary embodiment.
Figure 8A:
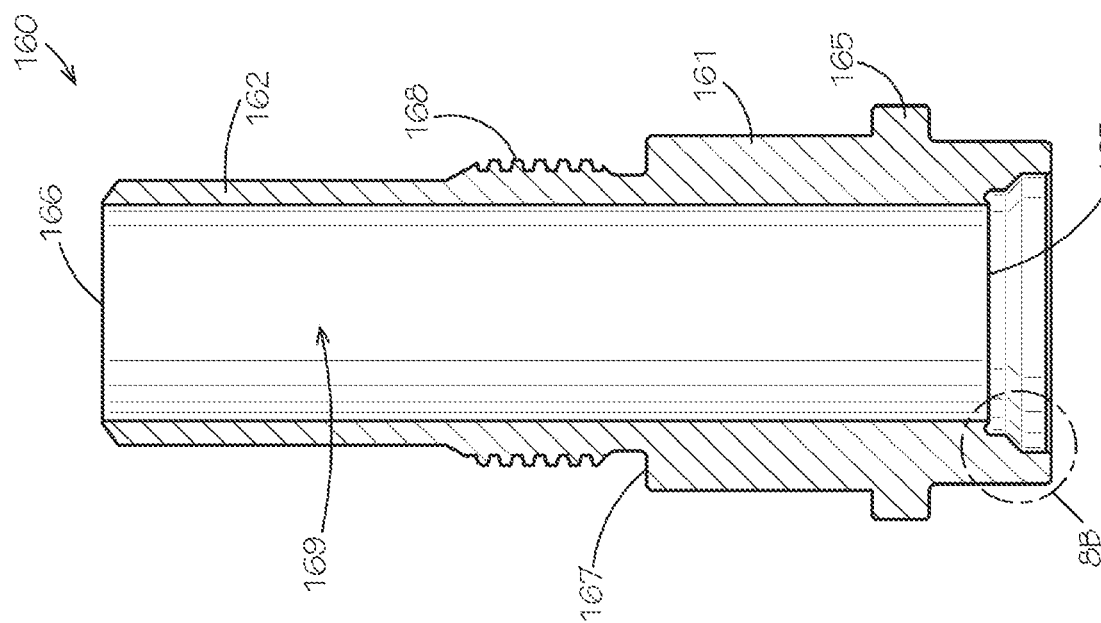
Figure 10B:
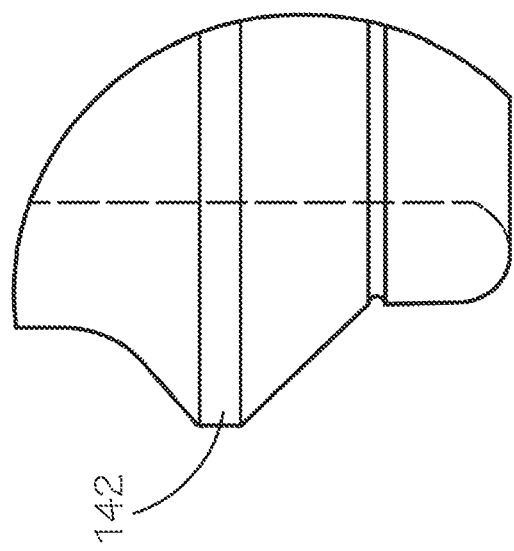
FIG. 10A show an external view of the seal ring 140 and FIG. 10B shows a close-up view of the ridge 142 of the seal ring 140 in accordance with the exemplary embodiment.
Figure 10A:
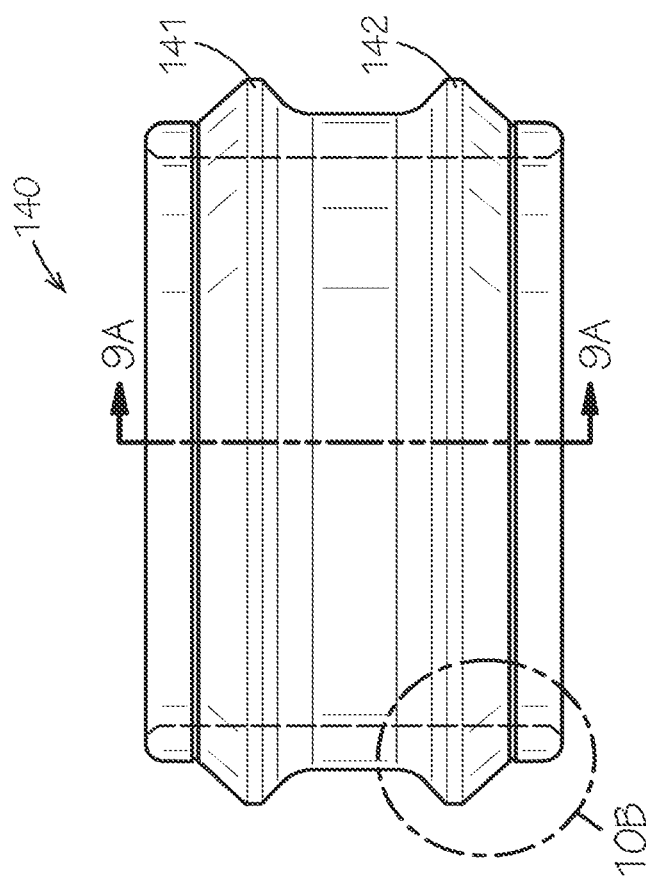

The box 160 is cylindrical in shape and includes a first portion 161 and a second portion 162 extending from the end of the first portion 161. The box 160 defines a passage 169 extending therethrough for fluid, either liquids or gases, to flow therethrough. The first portion 161 extends from a first end 163 of the box 160 to the second portion 162 and has a substantially smooth internal surface having a constant circumference, except for a groove 164 formed at the first end 163 of the box 160. The groove 164 is configured to allow the box's first end 163 to be inserted into the pin's second end 121 and fit adjacently around the seal ring's second ridge 142 and the seal ring's end between the seal ring 140 and the pin 110. Further, the internal surface of passage 169 has first groove 164 and a second groove 170 formed therein, wherein the second groove 170 is formed deeper that the first groove 164, as shown in FIG. 8B. The first portion's 161 internal surface has a circumference or diameter that is the same as the circumference or diameter of the pin's first portion 111. The first portion's 161 outer surface has a circumference that is constant as the outer surface extends from the first end 163 to the second portion 162 but includes a ridge 165 extending outwardly therefrom adjacent the first end 163. The first portion's 161 outer surface is dimensioned to fit within the pin's second portion's 113 inner surface and the ridge 165 extends sufficiently outward from the first portion's 161 outer surface to be equal to the circumference of the pin's second portion's 113 outer surface once the box's first portion 161 is installed within the pin's second portion 113. The second portion 162 extends from the first portion to a second end 166 of the box 160 and has a smooth internal surface having a constant circumference. The second portion's 162 internal surface has a circumference or diameter that is the same as the circumference or diameter of the box's first portion 161. The outer surface of the second portion 162 has a diameter or circumference that is smaller than the outer surface or diameter of the first portion's 161 outer surface, thereby causing the second portion 162 to have a smaller thickness than the first portion 161 and forming a ledge 167 where the first portion 161 transitions to the second portion 162. The second portion 162 includes a plurality of threads 168 extending outwardly from its outer surface adjacent to the end of the box's first portion 161. FIGS. 7A, 7B, 8A and 8B show cross-sectional or perspective views of a box 160 in accordance with an exemplary embodiment.

Figure 11B:
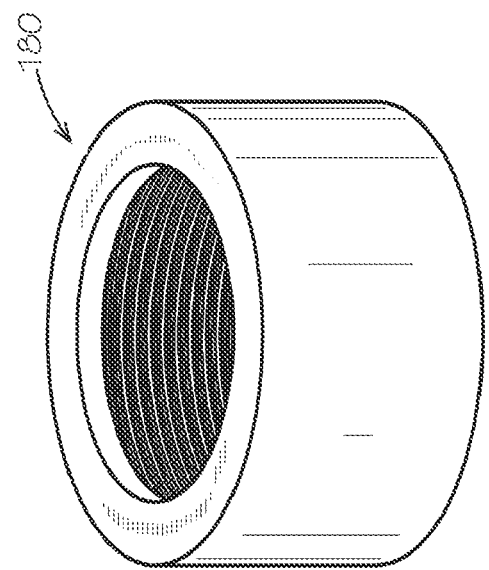
FIG. 11A shows a cross-sectional view of the locking nut 180 and FIG. 11B shows a perspective view of the locking nut 180 in accordance with the exemplary embodiment.
Figure 11A:
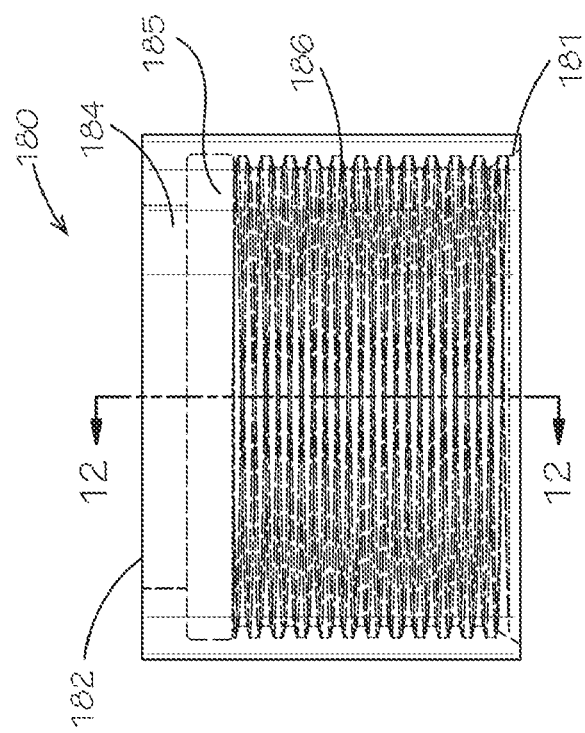
Figure 12:
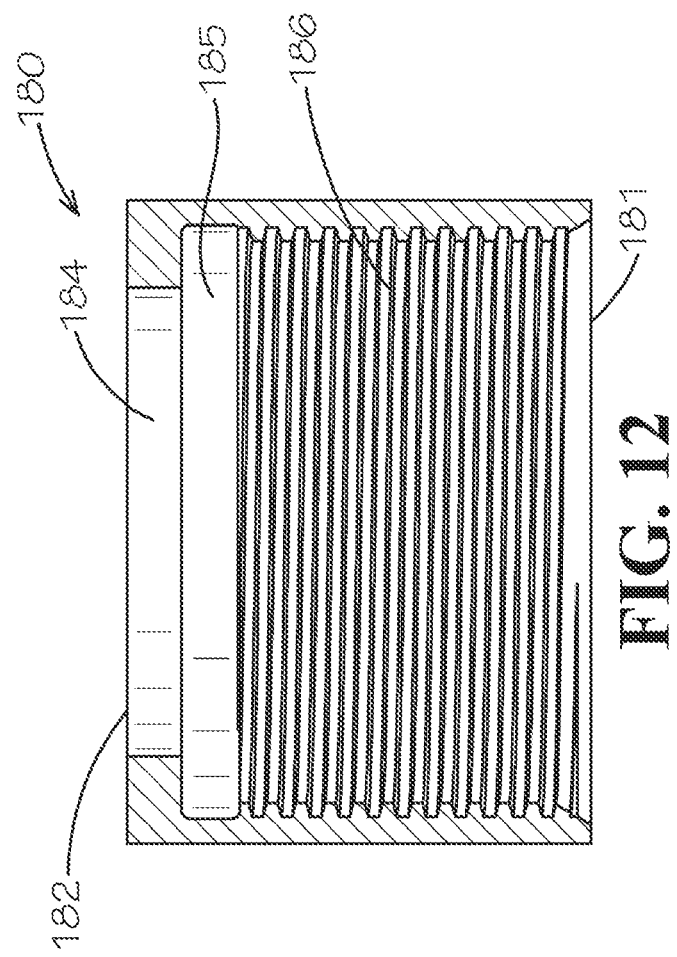
FIG. 12 shows a cross-sectional view of the locking nut 180 in accordance with the exemplary embodiment.

The locking nut 180 is cylindrical in shape and extends from a first end 181 to a second end 182. The locking nut 180 defines a passage 183 extending therethrough for allowing the box's second portion 162 and a portion of the box's first portion 161 to pass therethrough. The locking nut 180 includes a first internal ridge 184 formed at the second end 182, which extends inwardly from the internal surface of the locking nut 180. The locking nut 180 also includes a second internal ridge 185 formed adjacent the first internal ridge 184, which extends inwardly from the internal surface of the locking nut 180 but not as far as the first internal ridge 184 extends. The locking nut 180 further includes a plurality of threads 186 extending inwardly from its inner surface extending from the first end 181 to the second internal ridge 185. The locking nut 180 is configured to be coupled around a portion of the pin 110 and a portion of the box 160. FIGS. 11A, 11B and 12 show cross-sectional or perspective views of a locking nut 180 in accordance with an exemplary embodiment.

Figure 13B:
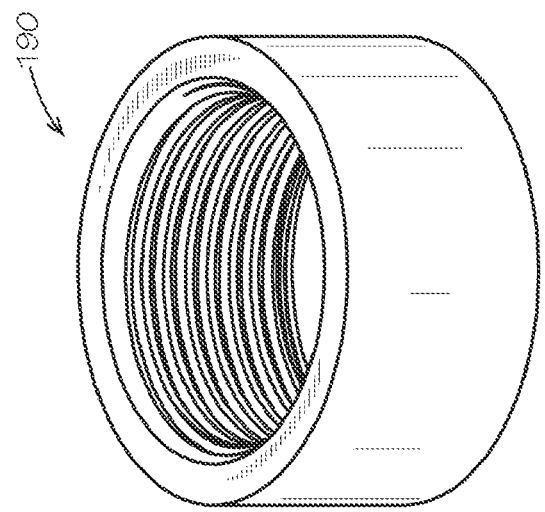
FIG. 13A shows a cross-sectional view of the retaining nut 190 and FIG. 13B shows a perspective view of the retaining nut 190 in accordance with the exemplary embodiment.
Figure 13A:
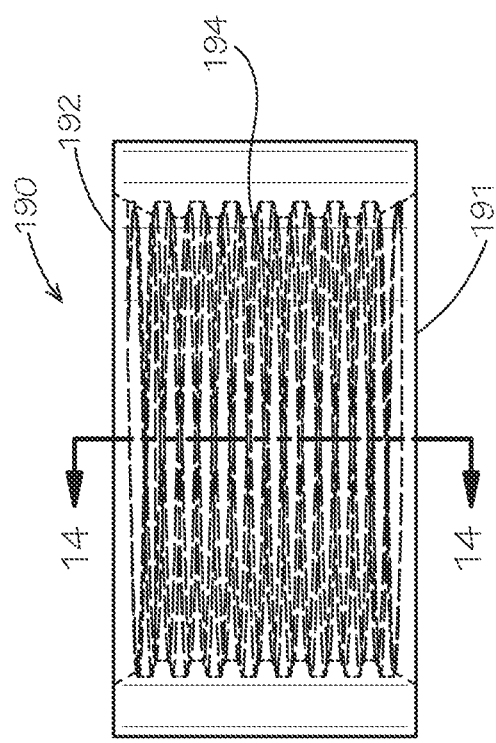

The retaining nut 190 is cylindrical in shape and extends from a first end 191 to a second end 192. The retaining nut 190 defines a passage 193 extending therethrough for allowing a portion of the box's second portion 162 to pass therethrough. The retaining nut 190 includes a plurality of threads 194 extending inwardly from its inner surface extending from the first end 191 towards the second end 192, and in some embodiments, the plurality of threads extends entirely to the second end 192. The retaining nut 190 is configured to be coupled around a portion of the box's second portion 162 that is adjacent the box's first portion 161. FIGS. 13A, 13B and 14 show cross-sectional or perspective views of a retaining nut 190 in accordance with an exemplary embodiment.

Referring to FIGS. 1-4, assembly of the pipe connector 100 occurs by first inserting the retainer ring 150 into the pin's third groove 125 in the ledge 124. The seal ring 140 is inserted into the pin 110 such that the seal ring's first ridge 141 is inserted and secured into the pin's second groove 120 and the end of the seal ring 140 adjacent the first ridge 141 rests atop and adjacent the pin's first groove 119. The seal ring's second ridge 142 is positioned adjacent to and rests on the pin's ledge 124 on the opposite side of the pin's ledge 124 than where the first ridge 141 is positioned. The seal ring's passage 143 is positioned adjacent to and abuts the pin's passage 114 that extends from the pin's first portion 111, thereby making passage 114 and passage 143 continuous and smooth with a constant internal circumference or diameter.

Next, a portion of the box 160 is inserted into the pin 110 and around the seal ring 140 according to the exemplary embodiment. The connection of the box 160 to the pin 110 is not secured at this time and can easily be removed. Once a portion of the box 160 is inserted into the pin 110 and the box's groove 164 is positioned around the seal ring 140, the box 160 is set in place. Once the box 160 is set in place with respect to the pin 110, the box's ridge 165 is positioned adjacent to and abutting the pin's second end 121.

After the box's ridge 165 is positioned adjacent to and abutting the pin's second end 121, the locking nut 180 slides over the box 160 and the locking nut's plurality of threads 186 engages the pin's second portion's plurality of threads 122. The locking nut 180 is rotated so that the locking nut's plurality of threads 186 is coupled to the pin's second portion's plurality of threads 122 and then eventually also couples to the pin's transition portion's plurality of threads 117. The locking nut's first internal ridge 184 provides a stop for the locking nut 180 once the first internal ridge 184 abuts the box's ridge 165. Once the locking nut 180 is securely coupled to the pin 110 and the box 160, the box 160 is securely coupled to the pin 110. At this time, the seal ring 140 is compressed and seals the connection between the pin 110 and the box 160. Also at this time, the box's passage 169 is positioned adjacent to and abuts the seal ring's passage 143, thereby making passage 114, passage 143, and passage 169 continuous and smooth with a constant internal circumference or diameter.

Next, the retaining nut 190 slides over a portion of the box 160 and the retaining nut's plurality of threads 194 engages the box's second portion's plurality of threads 168. The retaining nut 190 is rotated so that the retaining nut's plurality of threads 194 is coupled to the box's second portion's plurality of threads 168. The retaining nut 190 is threaded (left-hand thread) onto the box's second portion's plurality of threads 168. The box's ledge 167 provides a stop for the retaining nut 190 once the retaining nut's first end 191 abuts the box's ledge 167. The retaining nut 190 is used for disassembly of the pipe connector 100.

In certain embodiments, breaking the seal between the pin 110 and the box 160 is achieved by rotating the locking nut 180 backwards and moving the locking nut 180 towards the retaining nut 190 in accordance with the exemplary embodiment. The locking nut 180 is then unscrewed from the pin's second portion's plurality of threads 117 such that the locking nut's first internal ridge 185 is backed up and positioned adjacently and abutting the retaining nut 190. As the locking nut 180 is backed up towards the retaining nut 190, the locking nut 180 will no longer compress the seal ring 140, thereby breaking the seal between the pin 110 and the box 160.

Referring to FIG. 4, the seal ring 140 creates a plurality of sealing contact areas 410, 412, 414, 416 with adjacent components that create a seal between the pin 110 and the box 160. The seal ring 140 creates a first sealing contact area 410 between the seal ring 140 and the pin 110 adjacent collective passage 114, 143 formed by the pin 110 and the seal ring 140. The seal ring 140 also creates a second sealing contact area 412 between the seal ring 140 and the pin 110 further away from the collective passage 114, 143 formed by the pin 110 and the seal ring 140. This second sealing contact area 412 provides a backup sealing contact area in the event the first sealing contact area 410 fails. The pin 110 is compressed more into the sealing ring 140 at the second sealing contact area 412 than at the first sealing contact area 410. Similarly, the seal ring 140 creates a first sealing contact area 414 between the seal ring 140 and the box 160 adjacent collective passage 143, 169 formed by the seal ring 140 and the box 160. The seal ring 140 also creates a second sealing contact area 416 between the seal ring 140 and the box 160 further away from the collective passage 143, 169 formed by the box 160 and the seal ring 140. This second sealing contact area 416 provides a backup sealing contact area in the event the first sealing contact area 414 fails. The box 160 is compressed more into the sealing ring 140 at the second sealing contact area 416 than at the first sealing contact area 414. Further, the compression of the pin 110 into the seal ring 140 at the first sealing contact area 410 is about the same magnitude as the compression of the box 160 into the seal ring 140 at its first sealing contact area 414. Similarly, the compression of the pin 110 into the seal ring 140 at the second sealing contact area 412 is about the same magnitude as the compression of the box 160 into the seal ring 140 at its second sealing contact area 416.

The exemplary pipe connector can be assembled or disassembled to connect pipes directly or remotely. In certain embodiments, the exemplary pipe connector 100 allows pipe connections to be stabbed and tightened or loosened and separated remotely. As referred to herein, to term "remote assembly" means assembly of the connector from a distance using a computer and/or other device to assemble the connector. As referred to herein, to term "remote disassembly" means disassembly of the connector from a distance using a computer and/or other device to assemble the connector. Remote assembly or remote disassembly of the exemplary pipe connector can be accomplished, for example, robotically.

The pipe connector 100 is self-aligning during installation and assembly. The seal ring 140 has redundant sealing areas, as described above with respect to FIG. 4, for added reliability. The seal ring 140 has a retaining ring 150 to maintain proper location during assembly and disassembly. In addition to securely locking the two halves, the pin 110 and the box 160, together, the locking nut 180, or clamp assembly, also separates these two halves during the disassembly, breaking any stiction that makes separation difficult. This design is stronger than the pipe and has lower stresses. This pipe connector 100 is rated for temperatures over 700° C., pressures up to 15,000 psi, and for use also with hostile fluids, such as molten fluoride salts. This pipe connector 100 provides a connection that is rated for both gas and liquid. This pipe connector 110 may present some advantages, which include remote assembly and remote disassembly, use in hazardous environment, ability to separate the seal between the pin 110 and the box 160 without difficulty, redundant sealing contact areas between the seal ring 140 and each of the pin 110 and the box 160 for improving, and rating for over 700° C. and up to 15,000 psi in either gas or liquid.

The pipe connector 100 provides for self-alignment between the pin 110 and the box 160. A lead-in taper on the pin 110 initially engages the box 160. The box 160 must be aligned with the pin 110 and the common centerline before the seal ring 140 begins to engage the box 160 and before the locking nut 180 begins to engage the threads on the pin 110. This feature assures that the seal ring 140 is not damaged and that the threads are not cross threaded.

The pipe connector 100 also provides for forced separation between the pin 110 and the box 160. This feature is beneficial if the pipe connector 100 carried a fluid that hardens when the temperature is lowered to facilitate disassembly of the connection between the pin 110 and the box 160. Many times, this solid material creates a high stiction force making separation of the box 160 and the pin 110 difficult. In this embodiment, the locking nut 180 and the retaining nut 190 are designed to contact each other before the connection is fully separated. The locking nut threads 186 are in an opposite direction than the retaining nut threads 194 (one being a right hand turn while the other is a left hand turn), which allows for this force separation in accordance with the embodiment shown herein. The locking nut threads 186 provide a mechanical advantage, like a mechanical jack, in "pushing" the retaining nut 190 which causes separation between the pin 110 and box 160.

The pipe connector 100 also provides for retaining of the seal ring 140 with the pin 110 when the box 160 and the pin 110 are disassembled. The seal ring 140 has a retainer ring 150 in the pin 110. The purpose of this retainer ring 150 is to maintain the seal ring 140 in its proper place while either making (assembling) or breaking (disassembling) the connection. The middle section of the seal ring 140 has a reduced outside diameter with angles that will contact the retainer ring 150 and prevent the seal ring 140 from falling out of position if the seal ring 140 starts becoming loose. The retainer ring 150 also assures that the seal ring 140 will always be attached to the pin 110.

In one embodiment, a pipe connector comprises:

(1) a cylindrical pin defining a passage therethrough, the pin comprising:
  (i) a first portion, a second portion, and a transition portion extending from the first portion to the second portion, the transition portion having a plurality of first threads extending outwardly from the outer surface of the transition portion, and the second portion having a plurality of second threads extending outwardly from the outer surface of the second portion; and
  (ii) a ledge extending inwardly from the internal surface of the pin where the transition portion and the second portion meet, the ledge defining a groove therein;

(2) a cylindrical seal ring defining a passage therethrough and comprising a first ridge and a second ridge extending outwardly from an outer surface of the seal ring, the first ridge being parallel to the second ridge, the seal ring inserted within the pin wherein the ledge is positioned between the first ridge and the second ridge, the passage of the seal ring being aligned with the passage of the pin;

(3) a retainer ring positioned within the grooved formed in the ledge and surrounding the outer surface of the seal ring;

(4) a cylindrical box having a first end and a second end and defining a passage extending therethrough and a plurality of threads extending outwardly from the outer surface, the box defining a groove formed at the first end, the first end of the box inserted into the pin wherein the first end surrounds a portion of the seal ring and is positioned between the seal ring and the pin, the passage of the box being aligned with the passage of the seal ring;

(5) a cylindrical locking nut defining a passage therethrough and comprising a plurality of threads extending inwardly from the internal surface of the locking nut, the locking nut positioned around the pin and the box and being threadedly coupled to the plurality of first threads and the plurality of second threads; and (6) a cylindrical retainer nut defining a passage therethrough and comprising a plurality of threads extending inwardly from the internal surface of the retainer nut, the retainer nut positioned around the box and being threadedly coupled to the plurality of threads of the box.

In certain embodiments, the pin comprises a taper at the distal end of the second portion, the taper providing self-alignment of the box with the pin as the box is coupled to the pin.

In certain embodiments, the locking nut is unscrewed to decouple the box from the pin, the locking nut provides a force upon the retaining nut that provides a force separation between the pin and the box, wherein the threads of the locking nut are in an opposite direction than the threads of the retaining nut.

In certain embodiments, the seal ring comprises a reduced outside diameter along the middle portion of the length of the seal ring, the reduced outside diameter having angles along both distal ends that will contact the retainer ring and prevent the seal ring from falling out of position if the seal ring starts becoming loose during connection or disassembly.

In certain embodiments, the seal ring is always retained with the pin during disassembly of the box from the pin.

In certain embodiments, the exemplary pipe connector is suitable for use in a reactor system involving molten salts. In certain embodiments, the exemplary pipe connector is encompassed by a heat jacket or insulating material to maintain temperature. Suitable heat jackets and insulating materials are known in the art.

In certain embodiments, the exemplary pipe connector is assembled or disassembled with a hydraulic torque wrench. Suitable hydraulic torque wrenches are known in the art.

In certain embodiments, the exemplary pipe connector can be disconnected robotically. In certain embodiments, the exemplary pipe connector can be disconnected remotely. Suitable devices for robotic or remote disconnection of the exemplary pipe connectors are known in the art.

In one embodiment, a system comprises an exemplary pipe connector as disclosed herein and a device for remote disconnection of the exemplary pipe connector.

In one embodiment, a system comprises an exemplary pipe connector as disclosed herein and a device for robotic disconnection of the exemplary pipe connector.

In one embodiment, a system comprises an exemplary pipe connector as disclosed herein and a hydraulic torque wrench.

In one embodiment, a system comprises an exemplary pipe connector as disclosed herein and a by a heat jacket or insulating material to maintain temperature.

Accordingly, many modifications and other embodiments set forth herein will come to mind to a person of ordinary skill in the art to which pipe connectors pertain having the benefit of the teachings presented in the foregoing descriptions and the associated drawings. Therefore, it is to be understood that the exemplary pipe connectors are not to be limited to the specific embodiment disclosed and that modifications and other embodiments are intended to be included within the scope of this application.

Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

Although specific terms are employed herein, they are used in a generic and descriptive sense only and not for purposes of limitation.

EXAMPLES

| Acronyms: | |
|---|---|
| ATHP | Ambient Temperature High Pressure: Ambient temperature, 90 psia |
| HTHP | High Temperature High Pressure: 725° C., 90 psia at temperature |
| CT | Component Testing |
| PT | Pressure Transducer |
| TP | Transfer Pot |

Example 1. Testing of Exemplary Pipe Connector

1. Summary of Lab Testing:

An exemplary pipe connector was designed to fix issues found during testing of other flanges and pipe connector options currently on the market. In this example, the pipe connector is intended to be used with a salt-wetted metal-to-metal seal operating at about 700° C. and a pressure of about 45 psia. The ability of the exemplary pipe connector to maintain a pressure of at least 90 psia when held at a temperature of at least 725° C. with the seal gasket submerged in molten salt for ten HTHP cycles was tested. The pipe connector was subsequently disassembled, the gasket replaced with a new one, and then tested for two additional more HTHP cycles. The testing of this exemplary pipe connector was successful with no failures.

2. Comparative Pipe Sealing Options or Connectors

The exemplary pipe connector was designed to overcome problems found with other (comparative) pipe sealing options during their testing. Other pipe sealing options, such as flanges, seal reliably once lined up properly, however this process can be slow. Disassembling the flange and removing the seal requires great effort. The salt strongly bonds to the metal walls, making separation of the seal from the seal surface difficult and increasing the chance of damaging the seal surface of the flange during the process. Additionally, the bolts and nuts frequently gall when repeatedly heated to 700° C., sometimes to the point of requiring them to be cut off during the disassembly process.

Figure 15:
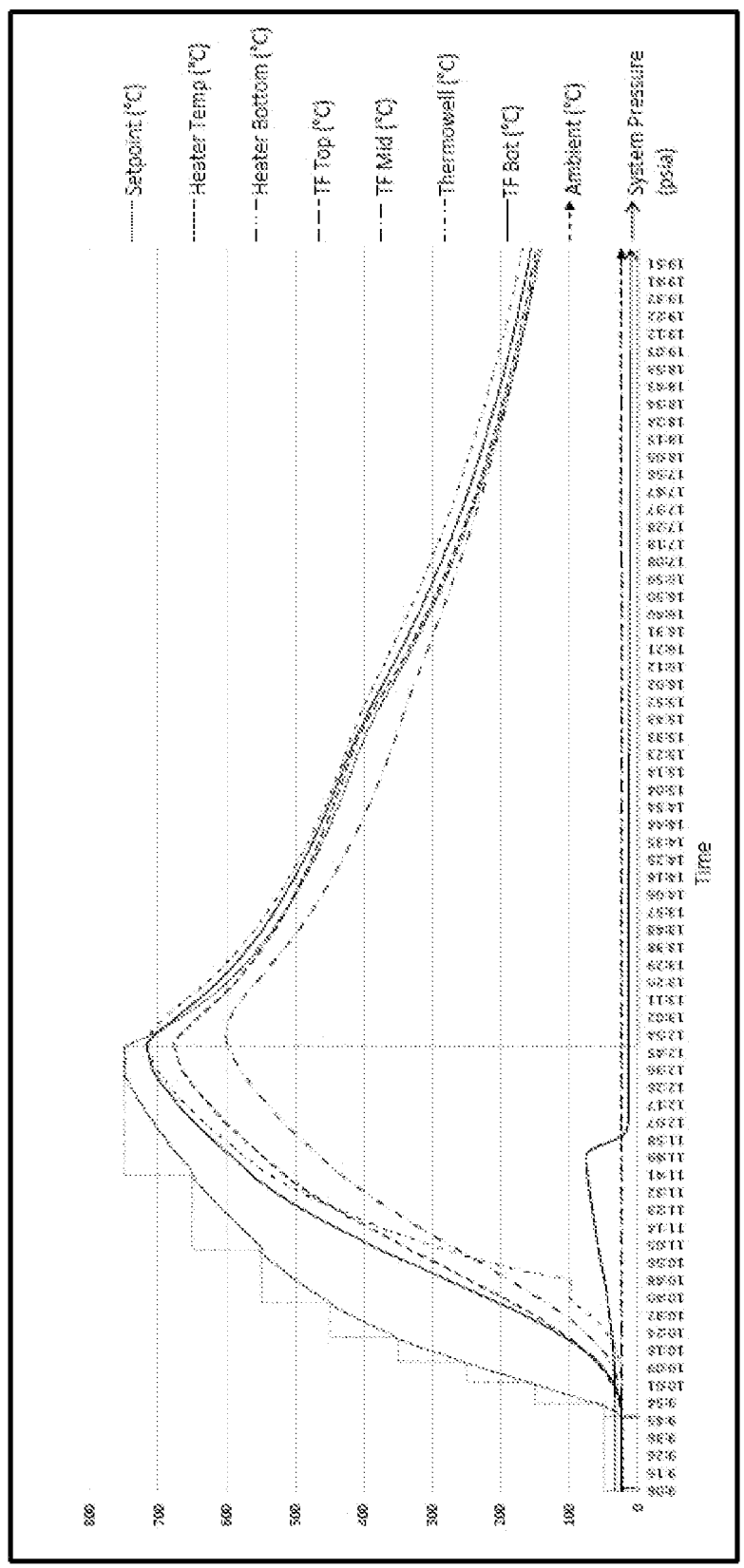
FIG. 15 is a graph of the results of a high temperature test of a comparative pipe sealing option.

One type of flange tested was easier to assemble, but the seals tested were less reliable for holding pressure when heating to 700° C. When cooling, it was observed that a pressure release occurred due to the different rates of dimensional change of the gasket and flange. Many of these issues were due to the differences in thermal expansion between the gasket material (varying) and the flange material (316 SS), particularly when the heat treatment of the gasket material was insufficient for high temperature applications. In certain sealing options, the seal failed when the bottom/interior of the vessel reached 600° C. because it was not meant for use at such high temperatures (FIG. 15).

The exemplary pipe connector was designed to address several of these issues. In particular, advantageous attributes of the exemplary pipe connector include:

1. Easy to line up the gasket with the seal surfaces.
2. Retention of the gasket with one end of the connection.

3. Redundant sealing surfaces on the gasket.
4. Easy to disassemble the flanges and remove the seal gasket.
5. Threads that resist galling while maintaining a large load.
6. The seal surface must not lose integrity when cooling down.

3. Test Report

Figure 16:
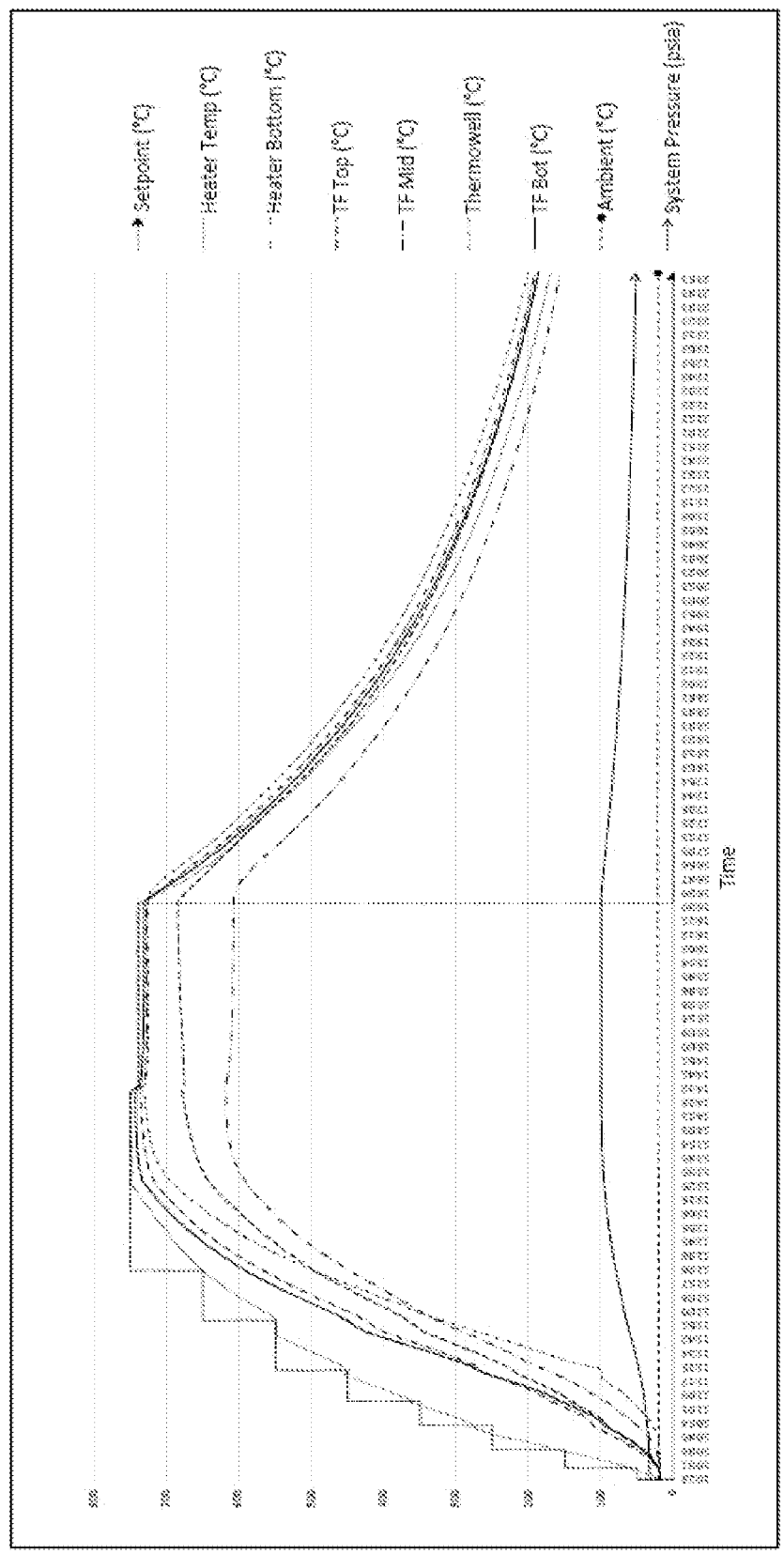
FIG. 16 is a graph of the results of a high temperature and high pressure test of an exemplary pipe connector.
Figure 17:
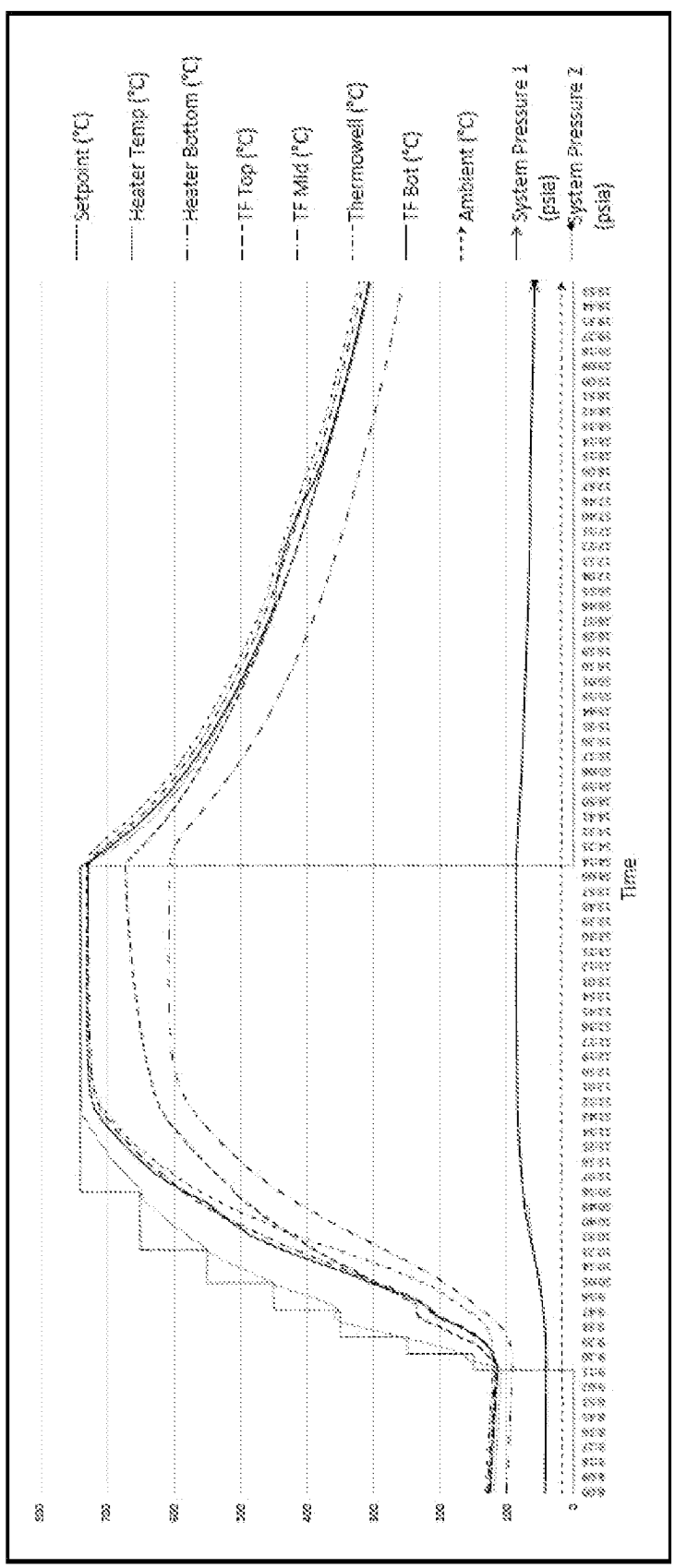
FIG. 17 is a graph of the results of a high temperature and high pressure test of an exemplary pipe connector containing salt.

We assembled the exemplary pipe connector and then performed four ATHP tests and two HTHP tests. FIG. 16 shows a graph from the second HTHP test. The first line above the x-axis (along the bottom) shows the pressure inside the vessel. Once the vessel reached ~725° C. at the TF Mid thermocouple, the temperature was maintained for three hours before cooling the system. Once these tests were completed, the pipe connector was disconnected to inspect the sealing surfaces and a new gasket was installed. One ATHP and two HTHP tests were performed to confirm sealing and then molten salt was added to the connector. 10 HTHP tests were performed with molten salt covering the seal gasket and in each case the system held pressure overnight, indicating 10 successful tests. The salt was transferred from the exemplary pipe connector to the TP, then the systems were disconnected from each other and disassembled. The seal surfaces and threads were cleaned and a new gasket was inserted. After the exemplary pipe connector was prepped, it was reassembled and an ATHP test performed. The exemplary pipe connector held pressure over the weekend, so it was ready for the last two HTHP tests. The exemplary pipe connector was vacuumed to remove the water from the remaining small layer of salt. After the system was dry, the final two HTHP tests were performed. These tests were completed and all testing was deemed successful. Tests showed that the pipe connector would maintain a seal at elevated temperatures in a molten salt environment, and would re-seal after disassembly, installation of a new gasket, and reassembly. FIG. 17 displays a typical test.

What is claimed is:

1. A pipe connector, comprising:
    a cylindrical pin defining a passage therethrough, the pin comprising:
        a first portion, a second portion, and a transition portion extending from the first portion to the second portion, the transition portion having a plurality of first threads extending outwardly from an outer surface of the transition portion, and the second portion having a plurality of second threads extending outwardly from an outer surface of the second portion; and
        a ledge extending inwardly from an internal surface of the pin where the transition portion and the second portion meet, the ledge defining a groove therein;
    a cylindrical seal ring defining a passage therethrough and comprising a first ridge and a second ridge extending outwardly from an outer surface of the seal ring, the first ridge being parallel to the second ridge, the seal ring inserted within the pin wherein the ledge is positioned between the first ridge and the second ridge, the passage of the seal ring being aligned with the passage of the pin;
    a retainer ring positioned within the groove formed in the ledge and surrounding the outer surface of the seal ring;
    a cylindrical box having a first end and a second end and defining a passage extending therethrough and a plurality of threads extending outwardly from an outer surface, the box defining a groove formed at the first end, the first end of the box inserted into the pin wherein the first end surrounds a portion of the seal ring and is positioned between the seal ring and the pin, the passage of the box being aligned with the passage of the seal ring;
    a cylindrical locking nut defining a passage therethrough and comprising a plurality of threads extending inwardly from an internal surface of the locking nut, the locking nut positioned around the pin and the box and being threadedly coupled to the plurality of first threads and the plurality of second threads; and
    a cylindrical retainer nut defining a passage therethrough and comprising a plurality of threads extending inwardly from an internal surface of the retainer nut, the retainer nut positioned around the box and being threadedly coupled to the plurality of threads of the box.

2. The pipe connector of claim 1, wherein the pin comprises a taper at a distal end of the second portion, the taper providing self-alignment of the box with the pin as the box is coupled to the pin.

3. The pipe connector of claim 1, wherein when the locking nut is unscrewed to decouple the box from the pin, the locking nut provides a force upon the retainer nut that provides a force separation between the pin and the box, wherein the threads of the locking nut are in an opposite direction than the threads of the retainer nut.

4. The pipe connector of claim 1, wherein the seal ring comprises a reduced outside diameter along a middle portion of a length of the seal ring, the reduced outside diameter having angles along both distal ends that will contact the retainer ring and prevent the seal ring from falling out of position if the seal ring starts becoming loose during connection or disassembly.

5. The pipe connector of claim 4, wherein the seal ring is always retained with the pin during disassembly of the box from the pin.

6. The pipe connector of claim 1, wherein the pipe connector is rated for a temperature greater than 700° C.

7. The pipe connector of claim 1, wherein the pipe connector maintains a seal connection between pipes at temperatures greater than 700° C.

8. The pipe connector of claim 1, wherein the pipe connector is rated for pressures ranging from atmospheric up to about 15,000 psi.

9. The pipe connector of claim 1, wherein the pipe connector maintains a seal connection between pipes at about 725° C. and about 100 psi.

10. The pipe connector of claim 1, wherein the pipe connector is suitable for use in a reactor system involving molten salts.

11. The pipe connector of claim 1, wherein the pipe connector is assembled or disassembled with a hydraulic torque wrench.

12. The pipe connector of claim 1, wherein the pipe connector is disconnected robotically or remotely.

* * * * *